Sept. 12, 1961     H. W. SPREITZER     2,999,408
MACHINE TOOL

Filed April 24, 1958                                                    2 Sheets-Sheet 1

INVENTOR.
HENRY W. SPREITZER
BY Hudson, Boughton,
Williams, David & Hoffmann
ATTORNEYS

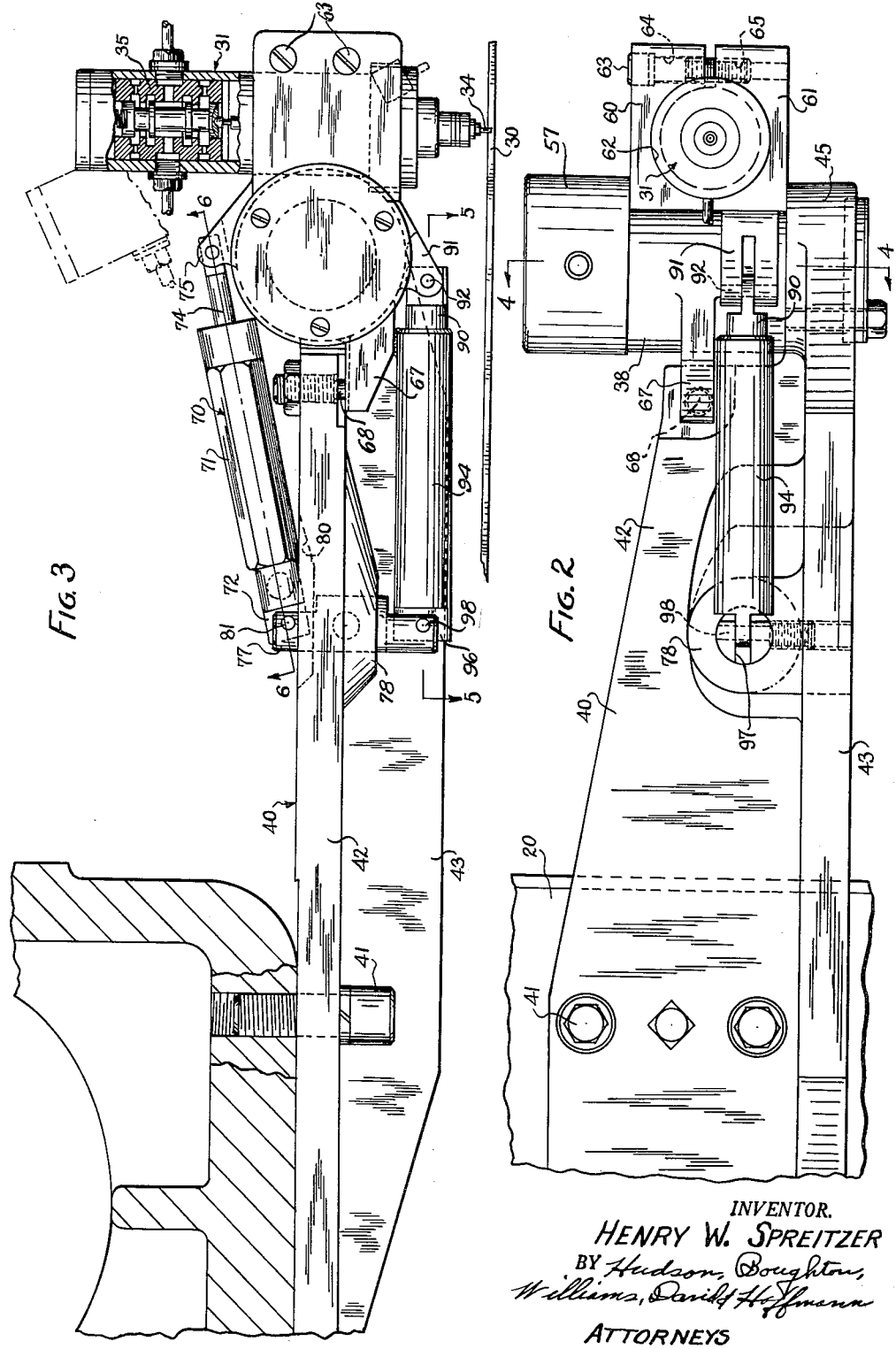

United States Patent Office 2,999,408
Patented Sept. 12, 1961

2,999,408
MACHINE TOOL
Henry W. Spreitzer, Shaker Heights, Ohio, assignor to The Warner & Swasey Company, Cleveland, Ohio, a corporation of Ohio
Filed Apr. 24, 1958, Ser. No. 730,630
12 Claims. (Cl. 82—14)

The present invention relates to a machine tool having a pattern-controlled slide and, more particularly, to the manner of supporting the element or device for reading the pattern and controlling the slide in accordance therewith.

The principal object of the present invention is to provide a new and improved machine tool in which a pattern-reading device for controlling the movements of a contouring or profiling slide is supported for movement to and from an operative position for reading a pattern and is accurately returnable to its pattern-reading position when moved therefrom.

Another object of the present invention is to provide a novel and improved machine tool in which the pattern-reading device for controlling the movements of a contouring or profiling slide is supported for swinging movement between an inactive position and an operative position for reading the pattern and is actuated between its positions by double-acting power means operable to quickly move the pattern-reading device to either of its positions, and in which a stop member limits the swinging movement of the device toward its operative position to its pattern-reading position.

Figure 1:
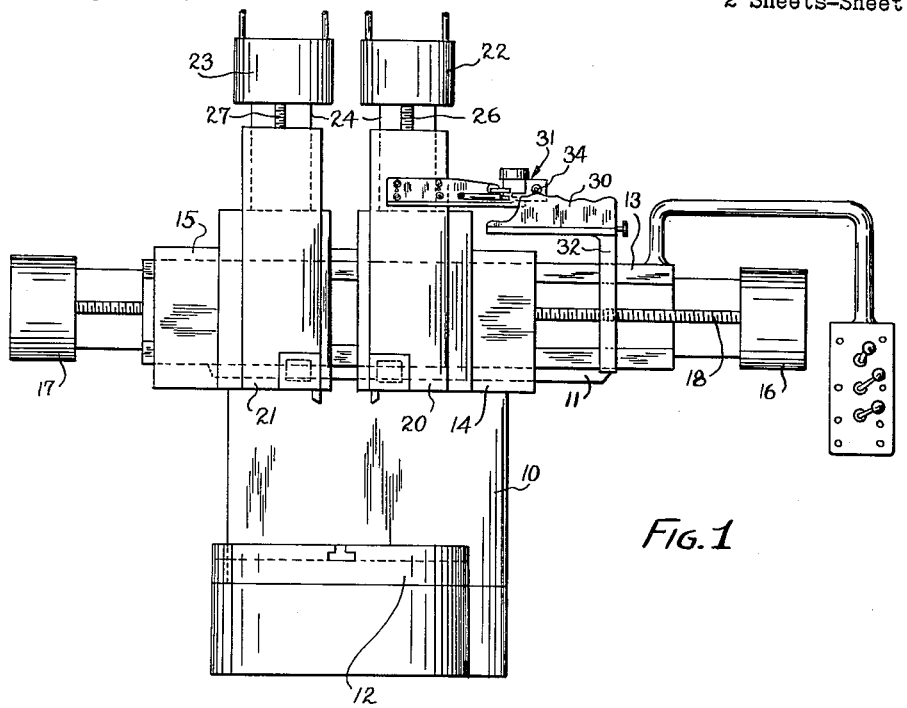
Figure 5:
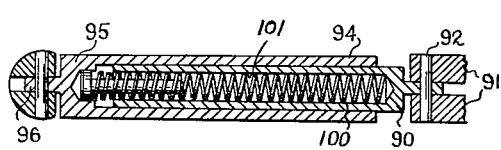
Figure 6:
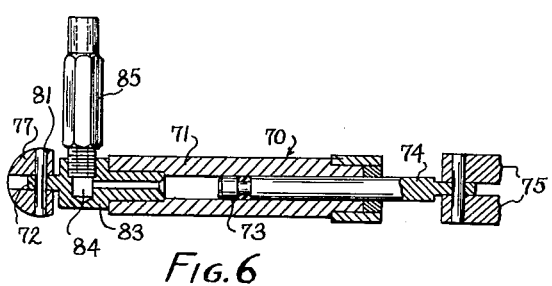
Figure 4:
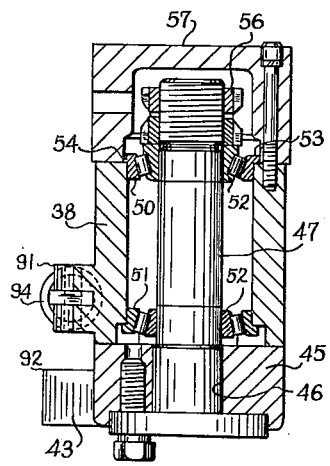

Further objects and advantages of the present invention will be apparent from the following detailed description of the preferred embodiment thereof made with reference to the accompanying drawings forming a part of the present specification and in which:

FIG. 1 is an elevational view of a vertical boring machine embodying the present invention, FIG. 2 is a fragmentary enlarged view of a portion of FIG. 1 showing the pattern-reading device and support therefor, FIG. 3 is a plan view of the portion of the machine shown in FIG. 2, FIG. 4 is a sectional view taken approximately along line 4—4 of FIG. 2, FIG. 5 is a sectional view taken approximately along line 5—5 of FIG. 3, and FIG. 6 is a sectional view taken approximately along line 6—6 of FIG. 3.

In a machine tool having contouring or profiling equipment, the tool and work supporting members are moved relative to each other in a feed direction to effect the machining operating and one of the members is moved in a second direction angularly related to the feed direction under the control of a pattern to effect the profiling of the workpiece. The member or slide which is actuated to effect the profiling of the workpiece is controlled by a pattern-reading device moved relative to the pattern in accordance with the relative feed movement of the tool and work supporting members. As the pattern-reading device and pattern are moved relative to each other the pattern-reading device reads the pattern and effects movement of the slide controlled thereby in the second direction to effect profiling of the workpiece.

Conventionally, the pattern is fixed to the frame of the machine tool and the pattern-reading device is carried by a movable tool slide which is moved in one direction relative to the frame to effect the feed movement between the tool and workpiece and in the second direction angularly related to the first direction to effect the profiling of the workpiece.

It will be understood, however, that insofar as the present invention is concerned it is immaterial whether the pattern-reading device or the pattern is mounted on the frame and whether the tool supporting member or the work supporting member is actuated to effect the feed and/or profiling movements. Furthermore, it will be understood by those skilled in the art that one of the work supporting and tool supporting members may be moved to effect the feed movement and the other moved under the control of the pattern to effect the profiling of the workpiece.

In accordance with the present invention, the pattern-reading device is mounted so that it may be swung to and from an operative position for reading the pattern. The support for the pattern-reading device is so constructed and arranged that when the pattern-reading device is moved to its pattern-reading position it is accurately positioned for reading the pattern and so that the swinging of the pattern-reading device from its operative position does not destroy the setting of the operative position making it possible to accurately return the pattern-reading device to its operative position. The pattern-reading device is actuated to and from its position in the preferred embodiment by double-acting power means and is limited in its movement toward the pattern by a stop member engaged by the device and against which it is held while reading the pattern. Preferably, the double-acting power means is operable to effect a quick retraction of the pattern-reading device from its operative position.

In the illustrated embodiment the pattern-reading device is supported on the tool slide of a vertical boring machine. The vertical boring machine is illustrated as comprising a column 10 having a transversely extending support member 11 at its upper end and a horizontal rotatable table 12 supported adjacent its lower end for rotation with respect thereto. The transversely extending member 11 has vertically spaced horizontal ways 13 formed thereon which support slide members 14 and 15 for horizontal movement therealong. The slide members 14 and 15 are moved horizontally on the ways 13 by hydraulic motors 16, 17 respectively supported at the opposite ends of the transversely extending member 11 and connected to the respective slide member by an individual lead screw 18.

The slide members 14, 15 have vertical ways thereon, not shown in the drawing, which support tool slides 20, 21 respectively for vertical movement. The tool slides 20, 21 are moved vertically by hydraulic motors 22, 23 respectively. The motors 22, 23 are respectively mounted on a portion 24 extending upwardly from the slide member supporting the respective tool slide actuated by the motor. The motors 22, 23 are connected to the tool slides 20, 21 respectively by corresponding lead screws 26, 27.

In the illustrated embodiment the machine is set up to contour an end face of a workpiece. The workpiece to be operated upon is mounted on the table 12 and a relative feed movement between the workpiece and the tool slides 20, 21 is effected by operating the motors 16, 17 to move the tool slides 20, 21 horizontally across the end face of the workpiece supported on the table 12. While the tool slides 14, 15 are being moved across the end face of the workpiece on the table 12 operation of the motors 22, 23 will effect movement of the tool slides vertically toward or away from the table 12 to, in turn, effect a profiling of the end face.

In the illustrated machine, the vertical movements of the tool slide 20 are controlled by profiling or contouring means comprising pattern 30 and a pattern-reading device 31. The pattern-reading device 31 controls the operation of the motor 22 to move the tool slide 20 toward and away from the work table 12 as the motor 16 moves the tool slide across the end face and thereby effects profiling of the end face of the workpiece.

The pattern-reading device 31 is mounted on the tool slide 20 and is movable therewith while the pattern 30 is supported by a bracket 33 fixed to the transversely extending member 11. The pattern 30 is disposed adjacent the pattern-reading device 31 and extends parallel to the ways 13 in the direction of movement of the pattern-reading device effected by operation of the motor 16 which moves the slide member 14 and, in turn, the tool slide 20 horizontally. The pattern-reading device 31 includes a deflectable element 34 which engages the upper edge of the pattern 30 and is movable toward or away from the upper edge by the operation of the motor 22 to move the tool slide 20 vertically. The deflection of the element 34 by the upper edge of the pattern 30 controls the operation of the motor 22 to maintain the upper edge of the pattern and the element 34 in a predetermined relative position hereinafter referred to as the "neutral position" of the deflectable member. The upper edge of the pattern has a contour which varies in accordance with the desired contour of the end face of the workpiece and when the edge drops or rises the corresponding deflection of the element 34 operates the motor 22 to move the slide 20 until the deflectable element 34 is in its neutral position.

The construction and operation of the pattern-reading device 31 have not been shown or described in detail since such pattern-reading devices and their manner of operation are well known to those skilled in the art and do not in themselves form a part of the present invention. The particular pattern-reading device shown in the drawings controls the tool slide 20 to produce a profile determined by the pattern 30 by controlling the operation of the hydraulic motor 22 for moving the tool slide 20. The illustrated pattern-reading device is of a conventional type shown in FIG. 7 of U.S. Patent No. 2,347,367 and the deflectable element 34 corresponds to the element 142 of the aforementioned patent and operates a valve 35 which controls the fluid pressure supply and return connections to the motor 22. There are, however, other types of patterns and pattern-reading devices well known to those skilled in the art which may be substituted for the pattern and pattern-reading device illustrated in the drawings. For example, the deflectable member 34 might operate to control electrically the operation of an electric motor for moving the tool slide 20 or the pattern-reading device may be of a type, for example, magnetic or photo responsive, which receives a control signal from the pattern as it scans the same and need not necessarily be moved vertically with the tool slide 20 as long as it scans the pattern in accordance with the feed movement between the tool and workpiece.

The pattern-reading device 31 is supported in an operative position for reading the pattern 30 by a rotatable member 38 rotatably supported by a plate-like bracket 40 detachably connected at one end to the tool slide 20 by bolts 41 and extending horizontally outwardly from the tool slide. The plate-like bracket 40 has an L-shaped cross section and includes a vertical leg 42 bolted to the tool slide 20 and a generally horizontal leg 43 extending forwardly from the leg 42 at the lower end thereof. The leg 43 extends beyond the outer end of the leg 42 and the outer end portion of the leg 43 has a boss 45 formed therein and upon which the rotatable member 38 is mounted. The boss 45 has a generally vertically extending opening 46 therein which receives the lower end of a post 47. The post 47 extends upwardly from the boss 45 through the rotatable member 38 and beyond the upper end of the rotatable member. In the illustrated embodiment, the rotatable member 38 is an annular member, as shown in FIG. 4, and the lower end of the member rides on the upper surface of the boss 45 and is supported for rotation with respect to the post 47 by anti-friction bearings 50, 51 positioned within the member 38 adjacent the upper and lower ends thereof respectively and having their inner races 52 pressed on the post 47 and their outer races 53 pressed in the annular member 38. It will be noted that the outer races 53 of the bearings 50, 51 each have an annular flange 54 which overlies the adjacent end of the rotatable member 38 and that the rollers of the bearings are inclined with respect to the axis of the turnpost so that the bearings will absorb end thrust of the member 38. Preferably the bearings 50, 51 support substantially the entire weight of the rotatable member 38 and take up the end thrust of the member. The upper portion of the post 47, which extends above the member 38 and the bearing 50, is threaded and lock nuts 56 are threaded thereon to lock the upper bearing 50 in place and preferably apply a prestress to the bearings 50, 51. The upper end of the turnpost 47 and the lock nuts 56 are covered by a cup-like cap member 57 secured to the upper end of the rotatable member 38.

The rotatable member 38 is formed with opposed clamp jaws 60, 61 which extend from the outer side of the rotatable member 38 and between which the pattern-reading device 31 is clamped. The jaws are integrally connected to each other at their inner ends and have recesses in their adjacent sides to define an opening 62 for receiving the pattern-reading device 31. The axis of the opening 62 is substantially horizontal so that the pattern-reading device 31 is supported with the axis thereof in a substantially horizontal position. To clamp the pattern-reading device between the jaws 60, 61, a bolt 63, received in an opening 64 in the upper jaw 60, is threaded into an opening 65 in the lower jaw 61 aligned with the opening 64. The bolt 63 is disposed adjacent the outer ends of the jaws and is rotatable to clamp or release the pattern-reading device 31 for removal or adjusting movement relative to the jaws.

The rotatable member 38 is also formed with a stop portion 67 which, when the pattern-reading device 31 is in position to read the pattern 30, is in engagement with the end of a stop member or screw 68 threaded through the leg 42 and extending from the forward side thereof. The stop portion 67 is in the form of a lug which extends outwardly from one side of the rotatable member 38 and the stop member 68 is rotatable to adjust the position of the pattern-reading device when the stop portion 67 is in engagement with the stop screw 68.

It can be seen that when the pattern-reading device 31 is in a pattern-reading position, the leg 42 and the stop portion 67 cooperate to limit movement of the rotatable member 38 and, in turn, pattern-reading device 31 toward the pattern 30. The stop portion and the leg 42, however, allow the rotatable member 38 to be rotated to move the pattern-reading device 31 away from the pattern 30; i.e., in a counterclockwise direction, as viewed in FIG. 3.

The pattern-reading device 31 is held in its pattern-reading position with the stop portion 67 in engagement with the stop screw 68 by a fluid pressure actuator 70 connected to the rotatable member 38. When the device 31 is not in its pattern-reading position the actuator 70 is operable to rotate the latter to move the pattern-reading device toward the pattern 30 and the stop portion 67 toward the stop screw 68. The fluid pressure actuator 70 includes a cylinder element 71 having a lug 72 at one end thereof connected to the rearward side of the leg 42 and a piston element 73 having a rod 74 connected to an ear 75 on the rotatable member 38. The lug 72 of the cylinder element 71 is received in a slot in one end of a pin 77 supported in a horizontally extending opening of a boss 78 formed in the vertical leg 42. The pin 77 extends forwardly and rearwardly of the leg 42 and the leg 42 is recessed, as indicated, at 80 to provide clearance for the cylinder 70. The lug 72 is connected to the pin 77 for rotation about a vertical axis by a pivot pin 81. The lug 72 of the cylinder element 71 is formed as part of a fitting 83 having a passage 84 therein which communicates with the interior of the cylinder element 71 and which is connected to a source of fluid pressure or to a fluid pressure return through a connection 85 threaded into the fitting 83 and communicating with the passage 84.

When fluid pressure is supplied to the cylinder element 71 the rotatable member 38 is moved to a position where the stop portion 67 engages the stop screw 68 and the pattern-reading device 31 is in its pattern-reading position. When the cylinder element 71 is connected to fluid pressure return or drain the rotatable member 38 is rotated to move the stop portion 67 of the member 38 away from the stop screw 68 by a spring-biased plunger 90 connected to an ear 91 formed on the rotatable member by a pin 92. The ear 91 is on the opposite side of the rotatable member from the ear 75 and the spring-biased plunger 90 is located forwardly of the leg 42 and is received in a tubular member 94 having a closed end 95 formed with a lug 96 which is received in a slot 97 of the portion of the pin 77 extending forwardly of the leg 42. The lug 96 is connected to the pin 77 by a pivot pin 98 which permits movement of the tubular member 94 about a vertical axis. A spring 100 is disposed within the tubular member 94 and within the plunger 90, one end of the spring engaging the closed end 95 of the tubular member 94 and the plunger 90 having a bore 101 therein which receives the other end of spring 100.

When the cylinder element 71 is connected to drain or fluid pressure return, the spring 100 forces the rotatable member to rotate to a position determined by the minimum limit of the stroke of the actuator 70 to quickly move the pattern-reading device 31 away from the pattern. When pressure is supplied to the cylinder element 70 the force is such that the action of the spring 100 is overcome by the actuator 70 and the pattern-reading device 31 moved to its pattern-reading position in opposition to the action of the spring 100. When the pattern-reading device 31 is in its operative position, the pressure in the cylinder element 71 holds the stop portion 67 in engagement with the stop screw 68 and provides a rigid support for the pattern-reading device 31. It can be seen that the movement of the pattern-reading device 31 to a position clear of the pattern does not destroy the setting of the operative position determined by the engagement of the stop portion 67 with the stop screw 68 and that when the fluid pressure is supplied to the actuator 70 to return the pattern-reading device to its operative position it will be accurately returned to its position for reading the pattern 30. It also can be seen that the exact position of the pattern-reading device 31 relative to the pattern 30 when the stop portion 67 is in engagement with the stop screw can be adjusted by loosening the bolts 63 and moving the pattern-reading device axially with respect to the jaws 60, 61 and by adjusting the position of the stop screw.

It will be understood by those skilled in the art that the pattern-reading device and pattern could alternatively control the horizontal movement of the tool slide as the latter is fed vertically to effect an axial profiling of the workpiece rather than a profiling of the end face.

It can now be seen that the enumerated objects and others have been accomplished and that the present invention provides a novel and improved machine tool having a pattern-reading device which is readily moved between an operative position for reading the pattern and an inactive position clear of the pattern and that after the pattern-reading device has been actuated to its inactive position it can be readily and accurately returned to its operative position without the necessity of readjusting the pattern-reading position of the device. Furthermore, ready adjustment of the relative position between the pattern and the pattern-reading device when the pattern-reading device is in its operative position can be readily effected.

While the preferred embodiment of the present invention has been described in considerable detail, further modifications, constructions and arrangements will occur to those skilled in the art and it is hereby my intention to cover all such modifications, constructions and arrangements which fall within the ability of those skilled in the art and the scope and spirit of the present invention.

Having thus described my invention, what I claim is:

1. The combination comprising a pattern-reading unit for controlling a machine tool slide, said unit having an active pattern-reading position and an inactive position and including a pattern-responsive element and slide control means actuated by said element, a support for said unit, a post carried by said support, a first member fixed to said unit, bearing means on said post mounting said first member for rocking movement about said post and relative to said support to move said unit between said positions, said unit moving in a first direction when moving toward said active position and in a second direction when moving toward said inactive position, an abutment mounted adjacent said first member and supported stationarily with respect to said support, said abutment facing in said second direction, said first member having a portion engageable with said abutment to limit movement of the unit in said first direction, double-acting motor means effectively connected between said support and said first member for selectively rocking said first member and selectively operable to urge said portion into engagement with said abutment, and means connected to said abutment for adjusting the position of said abutment.

2. The combination comprising a pattern-reading unit for controlling a machine tool slide, said unit having an active pattern-reading position and an inactive position and including a pattern-responsive element and slide control means actuated by said element, a support for said unit, a post carried by said support, a first member fixed to said unit, bearing means on said post mounting said first member for rocking movement about said post and relative to said support to move said unit between said positions, said unit moving in a first direction when moving toward said active position and in a second direction when moving toward said inactive position, an abutment mounted adjacent said first member and supported stationarily with respect to said support, said abutment facing in said second direction, said first member having a portion engageable with said abutment to limit movement of the unit in said first direction, and double-acting motor means effectively connected between said support and said first member for selectively rocking said first member and selectively operable to urge said portion into engagement with said abutment.

3. The combination as defined in claim 2 wherein said double-acting motor means comprises a fluid pressure actuator for operating said member in at least one direction.

4. The combination as defined in claim 2 wherein said double-acting motor means comprises a fluid pressure actuator for operating said member in one direction and a spring urging said member in the opposite direction.

5. The combination comprising a pattern reading unit for controlling a machine tool slide, said unit having an active pattern-reading position and an inactive position and including slide control means and a pattern-responsive element for actuating the slide control means, a support member for said unit, means mounting said unit on said support member for reciprocatory movement between said positions, said unit moving in a first direction from its said inactive position to its said active postion, an abutment stationarily mounted with respect to said support member and disposed adjacent said unit and said unit having a portion engageable with said abutment upon movement in its said first direction to its said active position, said abutment limiting the movement of said unit in said first direction to said active pattern-reading position, double-acting motor means effectively connected between said support member and said unit and selectively operable to reciprocate said unit between said positions, and adjustment means connected to said abutment for adjusting the position of said abutment.

6. The combination as defined in claim 5 wherein said motor means is selectively operable to continuously urge said portion of said unit into engagement with said abutment.

7. The combination as defined in claim 6 wherein said motor means comprises a fluid-pressure-responsive actuator effectively connected between said unit and said support and actuatable to move said unit in its said first direction to urge said portion against said abutment.

8. The combination as defined in claim 6 wherein said motor means comprises a fluid pressure actuator for actuating said unit in one direction to one of its said positions and spring means opposing the operation of said actuator in said one direction and urging said unit in the opposite direction.

9. The combination comprising a pattern-reading unit for controlling a machine tool slide, said unit having an active pattern-reading position and an inactive position and including slide control means and a pattern-responsive element for actuating the slide control means, a support member for said unit, means mounting said unit on said support member for reciprocatory movement between said positions, said unit moving in a first direction from its said inactive position to its said active position, an abutment stationarily mounted with respect to said support member and disposed adjacent said unit and said unit having a portion engageable with said abutment upon movement in its said first direction to its said active position, said abutment limiting the movement of said unit in said first direction to said active pattern-reading position, and double-acting motor means effectively connected between said support member and said unit and selectively operable to reciprocate said unit between said positions.

10. The combination as defined in claim 9 wherein said motor means is selectively operable to continuously urge said portion of said unit into engagement with said abutment.

11. The combination as defined in claim 9 wherein said motor means comprises a fluid-pressure-responsive actuator effectively connected between said unit and said support and actuatable to move said unit in its said first direction to urge said portion against said abutment.

12. The combination as defined in claim 9 wherein said motor means comprises a fluid pressure actuator for actuating said unit in one direction to one of its said positions and spring means opposing the operation of said actuator in said one direction and urging said unit in the opposite direction.

References Cited in the file of this patent

UNITED STATES PATENTS

| | | |
|---|---|---|
| 1,504,496 | Peck | Aug. 12, 1924 |
| 2,678,538 | Cowan | May 18, 1954 |
| 2,800,839 | Horlacher | July 30, 1957 |